US005625609A

United States Patent [19]
Latta et al.

[11] Patent Number: 5,625,609
[45] Date of Patent: Apr. 29, 1997

[54] MULTIPLE DATA LAYER OPTICAL DISK DRIVE SYSTEM WITH FIXED ABERRATION CORRECTION AND OPTIMUM INTERLAYER SPACING

[75] Inventors: Milton R. Latta, San Jose; Hal J. Rosen, Los Gatos; Kurt A. Rubin, Santa Clara; Wade Wai-Chung Tang, San Jose, all of Calif.

[73] Assignee: International Business Machines Corporation, Armonk, N.Y.

[21] Appl. No.: 403,166

[22] Filed: Mar. 13, 1995

[51] Int. Cl.$^6$ .................................................. G11B 7/00
[52] U.S. Cl. .................... 369/44.23; 369/94; 369/275.1
[58] Field of Search .......................... 369/275.1, 275.3, 369/275.4, 66.23, 112, 94, 286, 288, 100; 250/201.5

[56] References Cited

U.S. PATENT DOCUMENTS

| | | | |
|---|---|---|---|
| 4,090,031 | 5/1978 | Russell | 358/130 |
| 4,450,553 | 5/1984 | Holster et al. | 369/275 |
| 4,791,625 | 12/1988 | Nakamura | 369/112 |
| 4,797,545 | 1/1989 | Shikama et al. | 250/201 |
| 4,908,813 | 3/1990 | Ojima et al. | 369/94 |
| 5,097,464 | 3/1992 | Nishiuchi et al. | 369/112 |
| 5,148,421 | 9/1992 | Satoh et al. | 369/44.23 |
| 5,157,555 | 10/1992 | Reno | 359/823 |
| 5,202,875 | 4/1993 | Rosen et al. | 369/94 |
| 5,235,581 | 8/1993 | Miyagawa et al. | 369/44.12 |
| 5,251,198 | 10/1993 | Strickler | 369/110 |
| 5,263,011 | 11/1993 | Maeda et al. | 369/44.27 |
| 5,280,464 | 1/1994 | Itoh et al. | 369/44.23 |

FOREIGN PATENT DOCUMENTS

0537904A2  4/1993  European Pat. Off. .

OTHER PUBLICATIONS

R. Kingslake, "Lens Design Fundamentals", Academic Press, pp. 119–208.

Press Release, "Philips and Sony Propose Specifications for High Density Multimedia Compact Disc", Dec. 16, 1994.

3M News, "3M Announces Dual–layer Construction Process for High–density CD–ROM", Nov. 14, 1994.

*Primary Examiner*—Thang V. Tran
*Attorney, Agent, or Firm*—Thomas R. Berthold

[57] ABSTRACT

A multiple data layer optical disk drive system has fixed aberration correction and uses a disk with maximum interlayer spacing for reduced interlayer crosstalk. In one embodiment the multiple data layer disk has a substrate with a thickness that is reduced by approximately one-half the thickness of the spacer layer that separates the first and last data layers. The disk is designed to operate with a lens that has spherical aberration correction to compensate for the thickness of a conventional single data layer disk. This allows the disk drive to handle multiple data layer disks as well as to be backward compatible and thus handle conventional single data layer disks. The thickness of the substrate material plus one-half the thickness of the spacer layer material (which may have a different index of refraction than the substrate material) is equivalent, for purposes of spherical aberration correction, to the thickness of the substrate material used in the conventional single data layer disk. The focused spot with minimum spherical aberration is thus located at the middle of the spacer layer rather than on the first data layer. The spacer layer thickness is selected so that when the focused spot is located on either the first or last data layer there is some deliberately designed spherical aberration, although an amount that is acceptable. As a result the thickness of the spacer layer can be significantly increased to thereby reduce interlayer crosstalk. In another embodiment that substrate thickness and spacer layer thickness are selected and then the lens is corrected for spherical aberration corresponding to the thickness of substrate material plus one-half the thickness of spacer layer material.

14 Claims, 7 Drawing Sheets

FIG. 8

MULTIPLE DATA LAYER OPTICAL DISK DRIVE SYSTEM WITH FIXED ABERRATION CORRECTION AND OPTIMUM INTERLAYER SPACING

TECHNICAL FIELD

This invention relates generally to optical data storage systems, and more specifically to optical disks that have multiple data layers and optical disk drives that are operable with such disks.

BACKGROUND OF THE INVENTION

Optical data storage systems provide a means for storing great quantities of data. The data is accessed by focusing a laser beam to a small spot on the data layer of the optical medium and then detecting the reflected light beam. Optical disk drive systems with removable optical disks are the most common form of optical storage. Various kinds of such systems are known. In a ROM (Read Only Memory) system, such as a compact disk system (e.g. CD-ROM, CD-Audio, CD-Video), data is permanently embedded as marks in the disk at the time of manufacture of the disk. The data is detected as a change in reflectivity as the laser beam passes over the data marks. A WORM (Write-Once Read-Many) system allows the user to write data by making marks, such as pits, in a recording layer of the optical disk. Once the data is recorded onto the disk it cannot be erased. The data in a WORM system is also detected as a change in reflectivity. There are also erasable optical data storage systems, such as phase change and magneto-optic (M-O) systems. While phase change systems also read data by sensing a change in reflectivity, M-O systems read data by measuring the rotation of the incident polarization caused by the M-O media.

To increase the storage capacity of an optical disk, multiple data layer systems have been proposed. An optical disk having two or more data layers may be accessed at different layers by changing the focal position of the lens. IBM's U.S. Pat. No. 5,202,875 describes a multiple data layer optical disk drive system wherein the optical disk comprises either a plurality of substrates, each with a data layer spaced apart by air gaps, or a plurality of data layers in a solid structure. U.S. Pat. No. 4,450,553 assigned to U.S. Philips, uses a solid structure with multiple data layers, where each data layer is a CD type data layer. In such multiple data layer optical disk drive systems, the light from the laser must pass through one or more of the light-transmissive disk substrates to access the data layers on the different substrates. The focusing of the light through a relatively thick light-transmissive substrate introduces spherical aberration into the light beam. If not corrected, this prevents the nearly diffraction-limited spot size from being achieved. In the case of conventional single-disk optical disk drives, this can be corrected by slightly changing the shape of the surfaces of the focusing lens by a fixed amount because the amount of substrate material through which the light must pass remains fixed. However, in multiple data layer optical disk drives, because the light is required to be focused through different numbers and thicknesses of substrates depending on which data layer is being accessed, some form of adjustable active compensation for spherical aberration is required. For example, U.S. Pat. No. 5,097,464 assigned to Matsushita, describes a multiple data layer CD system that uses a lens with aberration corrected for the data layer farthest from the lens and an optical path length corrector that is inserted into the optical path when the laser spot is focused on data layers closer to the lens. Also, IBM's U.S. Pat. No. 5,202,875 describes a multiple data layer optical disk drive system with an active aberration compensator.

An additional problem in multiple data layer systems is the need to be compatible with conventional single data layer disks, such as CDs. For example, conventional CDs use a 1.20 mm thick polycarbonate substrate. A multiple data layer CD disk drive must be able to focus a nearly diffraction-limited spot on the data layer of the conventional single data layer disk as well as on the multiple data layers of the newer multiple data layer disk.

Still another problem that occurs in multiple data layer systems is crosstalk caused by undesirable data, focus error and tracking error signals from adjacent data layers interfering with the signals from the desired data layer. These undesired signals are known as interlayer crosstalk. To avoid this problem it is necessary to maintain a relatively large spacing between the data layers. However, a relatively large spacing between data layers that are separated by solid spacer material increases the overall thickness of the disk and the amount of required active spherical aberration correction, both of which are undesirable.

What is needed is an optical disk drive that operates with single and multiple data layer disks and that minimizes the effects of spherical aberration and interlayer crosstalk.

SUMMARY OF THE INVENTION

The invention is a multiple data layer optical disk drive system that has fixed aberration correction and uses a disk with maximum interlayer spacing for reduced interlayer crosstalk. In one embodiment the multiple data layer disk has a substrate with a thickness that is reduced by approximately one-half the thickness of the spacer layer that separates the first and last data layers. The disk is designed to operate with a lens that has spherical aberration correction to compensate for the thickness of a conventional single data layer disk. This allows the disk drive to handle multiple data layer disks as well as to be backward compatible and thus handle conventional single data layer disks. The thickness of the substrate material plus one-half the thickness of the spacer layer material (which may have a different index of refraction than the substrate material) is equivalent, for purposes of spherical aberration correction, to the thickness of the substrate material used in the conventional single data layer disk. The focused spot with minimum spherical aberration is thus located at the middle of the spacer layer rather than on the first data layer. The spacer layer thickness is selected so that when the focused spot is located on either the first or last data layer there is some deliberately designed spherical aberration, although an amount that is acceptable. As a result the thickness of the spacer layer can be significantly increased to thereby reduce interlayer crosstalk. In another embodiment the substrate thickness and spacer layer thickness are selected and then the lens is corrected for spherical aberration corresponding to the thickness of substrate material plus one-half the thickness of spacer layer material.

For a fuller understanding of the nature and advantages of the present invention, reference should be made to the following detailed description taken together with the accompanying drawings.

DESCRIPTION OF THE PREFERRED EMBODIMENTS

Figure 1:
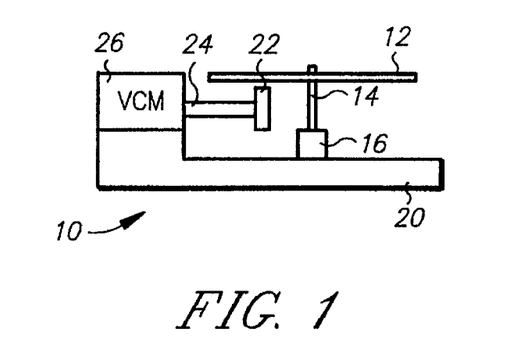
FIG. 1 is a schematic diagram of an optical disk drive system of the present invention in the form of a CD system.

FIG. 1 is a schematic diagram of an optical disk data storage system according to the present invention designated by the general reference number 10. System 10 will be explained in terms of a CD optical disk drive system. System 10 includes an optical data storage disk 12 which is preferably removably mounted on a damping spindle 14 as is known in the art. Spindle 14 is attached to a spindle motor 16, which in turn is attached to a system chassis 20. Motor 16 rotates spindle 14 and disk 12.

An optical head 22 is positioned below disk 12. Head 22 is attached to an arm 24, which in turn is connected to an actuator device such as a voice coil motor 26. Voice coil motor 26 is attached to chassis 20 and moves arm 24 and head 22 in a radial direction below disk 12.

Figure 2:
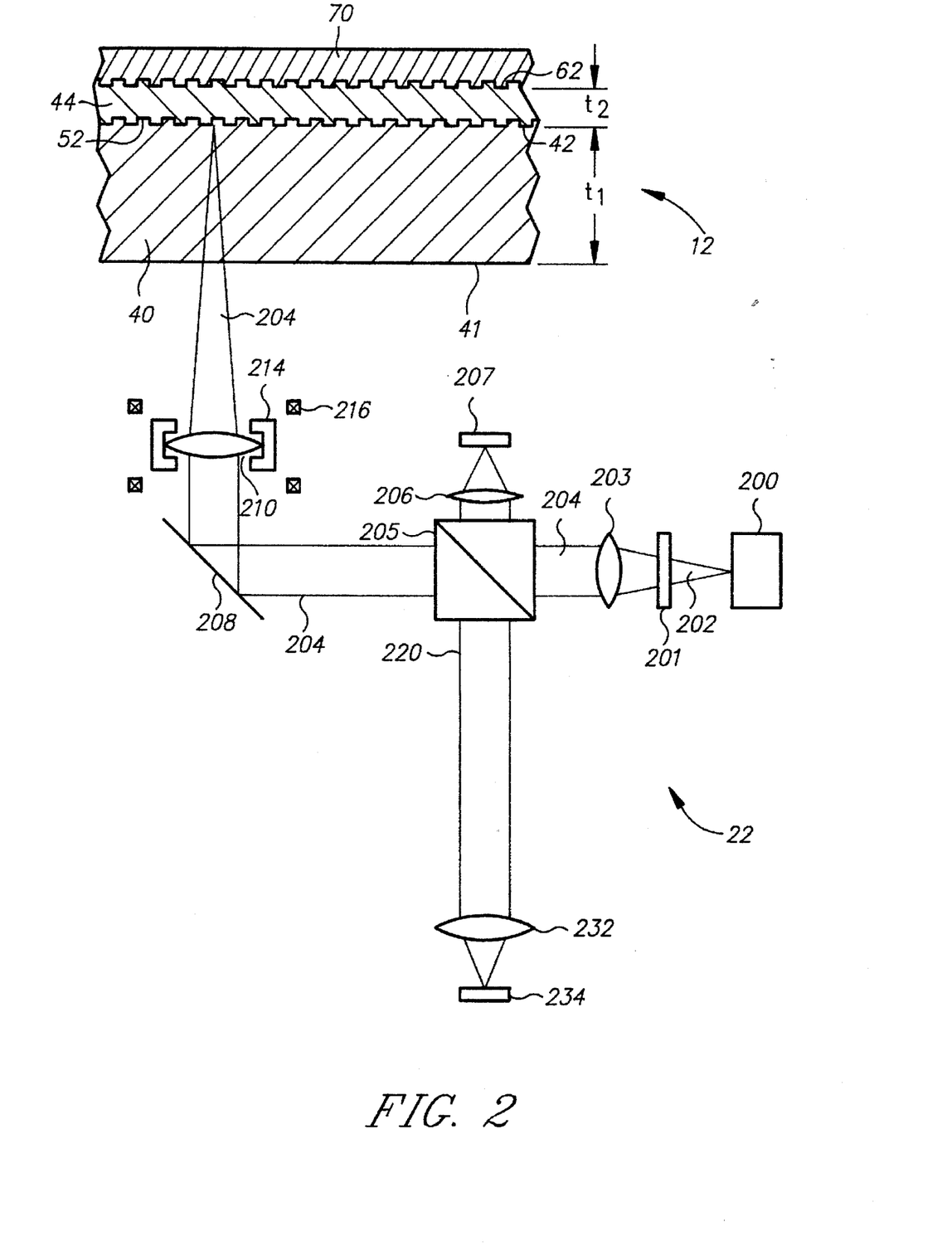
FIG. 2 is a schematic diagram of the optical head and two-layer disk of the optical disk drive system.

FIG. 2 shows a schematic diagram of one embodiment of the optical head 22 and disk 12 of FIG. 1. Optical head 22 includes a laser diode 200, which may be a gallium-aluminum-arsenide diode laser producing a primary beam of light 202 at approximately 780 nanometers wavelength. Beam 202 is first diffracted by grating 201 to produce two secondary beams for tracking, in addition to the primary data beam, and then collimated by lens 203. The resulting three-component beam 204 then passes to a beamsplitter 205. A portion of beam 204 is reflected by beamsplitter 205 to a lens 206 and an optical detector 207. Detector 207 is used to monitor the power of laser beam 204. Beam 204 from beamsplitter 205 next passes to and is reflected by a mirror 208. Beam 204 then passes through a focus lens 210 and is focused to a diffraction-limited spot. Lens 210 is mounted in a holder 214, the position of which is adjusted relative to disk 12 by a focus actuator motor 216, which may be a voice coil motor. Movement of the lens 210 by the focus actuator moves the focused spot between the two data layers 52, 62 of disk 12.

A portion of the light beam 204 is reflected from a data layer 52, 62 as a reflected beam 220. Beam 220 returns through lens 210 and is reflected by mirror 208. At beamsplitter 205, beam 220 is directed through an astigmatic lens 232 and onto a multielement optical detector 234.

Figure 3:
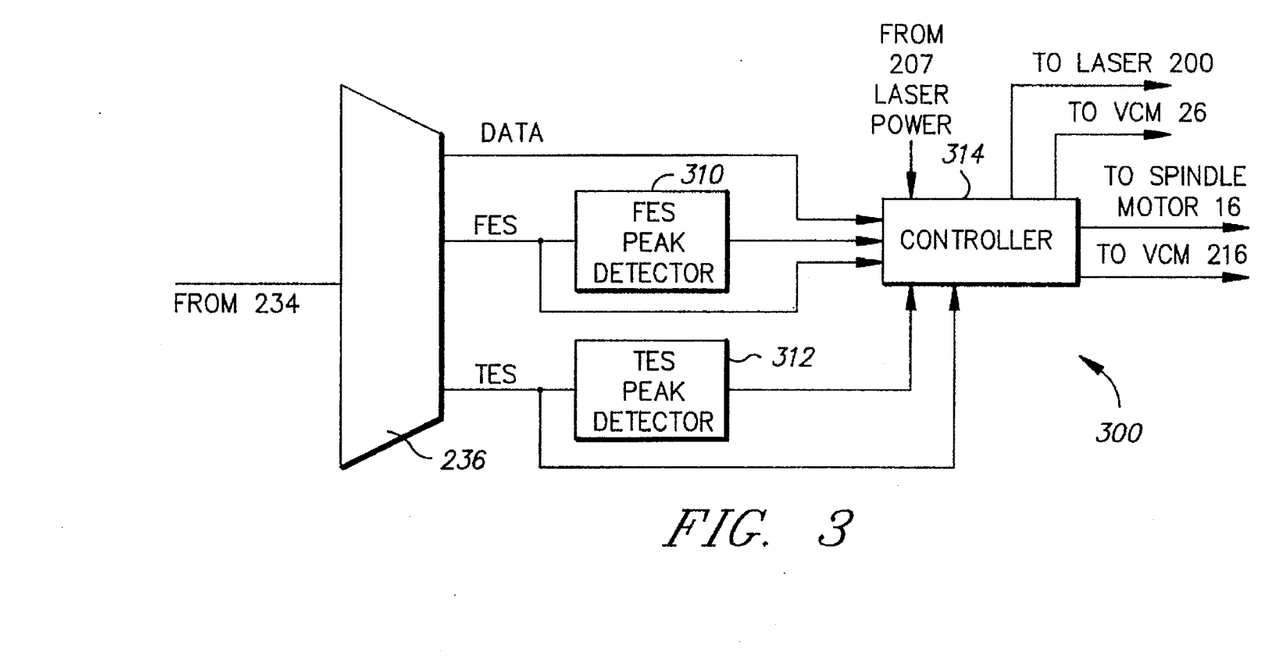
FIG. 3 is a block diagram of a controller system of the optical disk drive system.

FIG. 3 is a block diagram of a controller system of the optical disk drive system and is designated by the general reference number 300. The multielement detector 234 (FIG. 2) generates output signals that provide a data signal, a focus error signal (FES), and a tracking error signal (TES). These signals are amplified by signal amplifier 236 and sent directly to controller 314. A peak detector 310 also receives the FES, and a peak detector 312 also receives the TES from amplifier 236. Controller 314 also receives input signals from FES peak detector 310, TES peak detector 312, and laser power detector 207. Controller 314 is a microprocessor-based disk drive controller. Controller 314 is also connected to and controls the laser 200, head motor 26, spindle motor 16, and focus actuator motor 216.

Referring again to FIG. 2, the disk 12 is shown in cross-section. The disk 12 comprises a light-transmissive substrate 40, typically polycarbonate. A first surface 41 of substrate 40 faces lens 210 and is the side onto which the light is incident. The opposite surface of substrate 40 has formed on it a first data layer 52. Data layer 52 is a pattern of pits or depressions formed into the surface of substrate 40 and covered with a film of partially light-transmissive material. Data layer 52 is formed by conventional injection molding, embossing, or photopolymer replication. Substrate 40 and first data layer 52 are similar to that in conventional CDs, with the exception that the film covering the pattern of pits on the substrate surface is partially light-transmissive rather than totally reflective. This film of material can be formed of any conventional semiconductor material (e.g., amorphous Si, SiC, GaSb), dielectric material (e.g., $ZrO_2$, SiN), or metallic material (e.g., Al, Au). These materials can be deposited by sputtering or evaporation, as is known in the art, and have a thickness in the range of 30–3000 Angstroms. A light-transmissive spacer layer 44 is formed over data layer 52. The spacer layer can be formed of a photopolymer material deposited by spin-coating. Alternatively the spacer layer 44 can be formed by a lamination process, i.e., gluing a thin plastic sheet, embossed with data layer 62, onto the covering film of the data layer 52 on substrate 40. The surface of spacer layer 44 opposite the surface in contact with data layer 52 has formed on it a second data layer 62. Data layer 62 also comprises a pattern of pits, formed on the surface of the spacer layer 44, and a covering film of light-reflective material, such as an aluminum alloy. The aluminum alloy covering film is preferably totally reflective if the data layer 62 is the last data layer in the multiple data layer disk, and has a typical thickness in the range of 100–1000 Angstroms. The embossed pattern of data layer 62 can be formed by a photopolymerization process with a stamper in contact with the polymer, with the polymer cured by ultraviolet radiation. If the spacer layer is formed by lamination, the data layer 62 can be pre-embossed onto the plastic sheet before the sheet is glued to substrate 40. Typically the depth of the pits in the embossed patterns in data layers 52, 62 is in the range of 1000 to 2000 Angstroms. Finally, a protective layer 70 of a photopolymer is formed over data layer 62 by spin-coating followed by curing. The two-layer CD as shown in FIG. 2 is a dual data layer disk. The substrate 40 has a thickness t1 and is formed of light-transmissive material with an index of refraction n1. Spacer layer 44 has a thickness t2 and is formed of light-transmissive material with an index of refraction n2. Additional data layers may be used in the disk 12. For example, additional embossed patterns and partially light-transmissive films can be formed between the first and second data layers 52, 62.

The operation of optical storage system 10 (FIG. 1) may now be understood with reference to FIGS. 2 and 3. Controller 314 controls motor 16 that rotates disk 12 and motor 26 that moves optical head 22 to the proper position below disk 12. Laser 200 is energized to read data from disk 12. The beam 204 is focused by lens 210 to a nearly diffraction-limited spot and this focused spot is located on the desired one of the data layers 52, 62. The reflected beam 220 returns and is directed to the multielement detector 234 by the astigmatic lens 232. The FES, TES, and data signals are output by detector 234 and amplified by amplifier 236 (FIG. 3). The FES is used by controller 314 in a conventional servo control technique to control focus actuator motor 216 so that lens 210 maintains the spot on the desired data layer (e.g., data layer 52) as the disk 12 rotates. When it is desired to read data from data layer 62, the controller 314 signals focus actuator motor 216 to move the lens so the spot is moved from data layer 52 to data layer 62. When the spot is located on data layer 62, the light from lens 210 traverses the entire thickness t1 of substrate 40 and thickness t2 of spacer layer 44.

Figure 4:
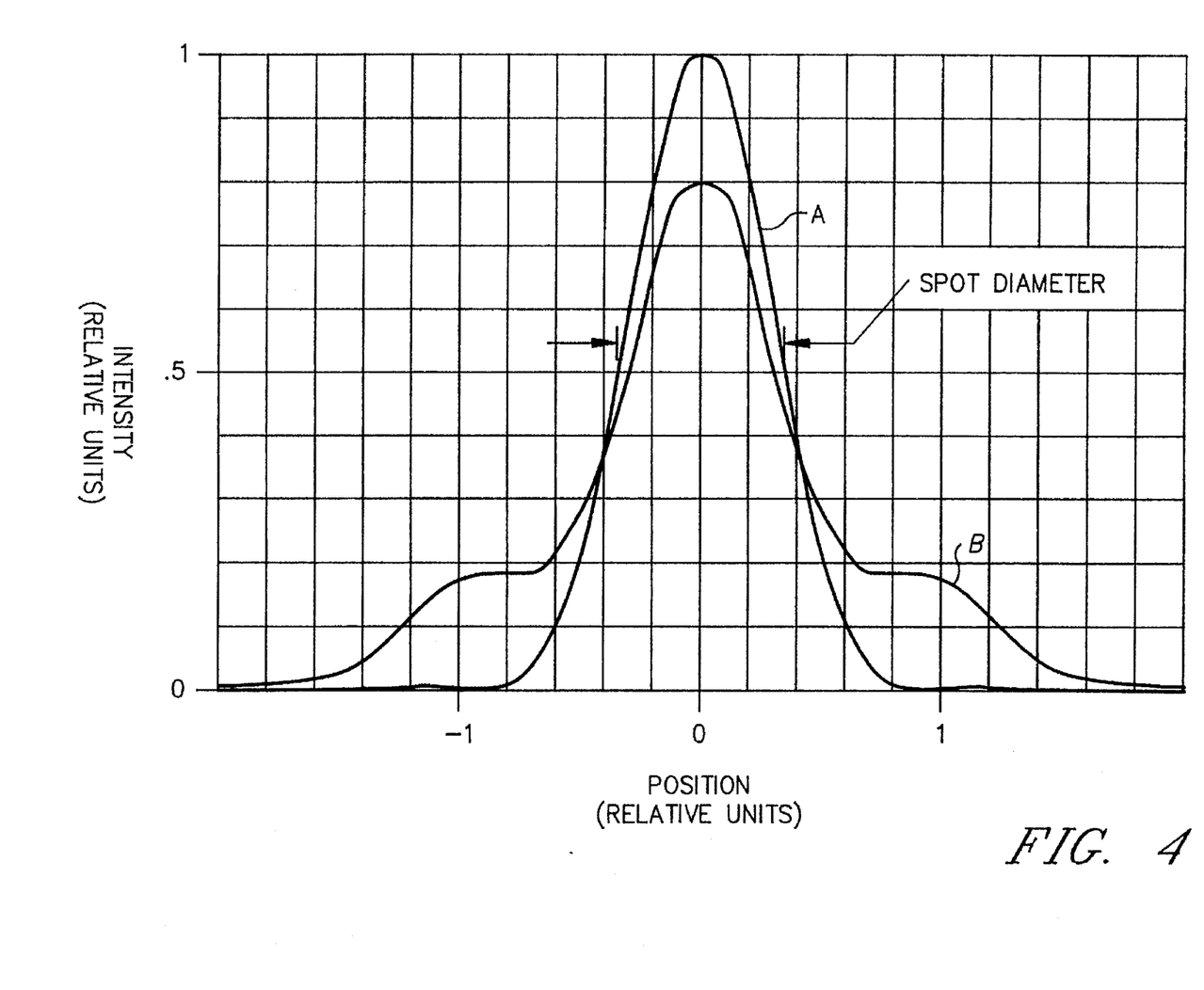
FIG. 4 is a graph illustrating the light intensity of a focused spot as a function of position across the beam for two cases: Curve A with minimal spherical aberration and Curve B with significant spherical aberration.

In optical disk drive systems it is desired to make the diameter of the focused spot as small as possible and to have minimum spherical aberration. Because the light is focused through the substrate, the refractive index and thickness of the substrate must be included in the design of the objective lens. Thus the lens is designed to have spherical aberration correction that corresponds to a fixed thickness of light-transmissive material having a known index of refraction. FIG. 4 is a graph of the light intensity of the focused spot as a function of lateral position from the center of the spot for two different spots: one having minimum spherical aberration and one having significant spherical aberration due to a non-optimum substrate thickness. Curve A in FIG. 4 represents a spot with minimum spherical aberration, and is an essentially Gaussian distribution of light intensity. The diffraction-limited spot diameter is defined as the full width at half the maximum intensity amplitude, and is depicted for Curve A in FIG. 4. Curve B in FIG. 4 represents a spot with spherical aberration and illustrates a lower peak intensity and the presence of side lobes. In an optical disk drive, if the lens is not corrected for the proper substrate thickness, the spot on the data layer will possess spherical aberration. This is undesirable because the data, focus error and tracking error signals all rely upon having maximum optical resolution.

Figure 5:
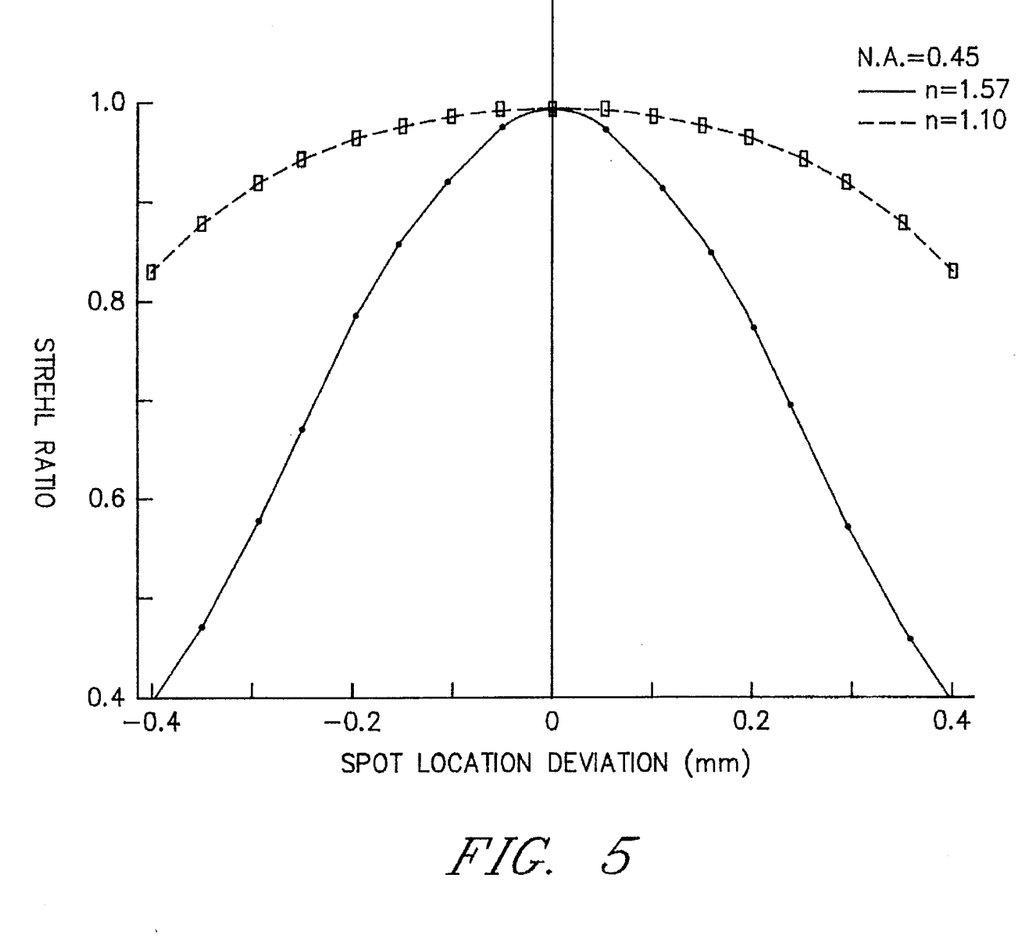
FIG. 5 is a graph of Strehl ratio, for two materials with different indices of refraction, as a function of distance from the location at which the spherical aberration is a minimum for a lens with N.A.=0.45.

The ratio of the peak intensity of a spot with aberration to the peak intensity of the nearly diffraction-limited spot without aberration is referred to as the Strehl ratio. FIG. 5 is a graph of Strehl ratio as a function of thickness deviation from the substrate thickness to which the lens was designed, for two materials having different indices of refraction, for a lens with N.A.=0.45. The solid line is the Strehl ratio for material with an index of refraction of 1.57 (e.g., polycarbonate) and the dashed line is the Strehl ratio for material with an index of refraction of 1.10. At a thickness deviation of zero the light has traversed the precise distance for which the lens has been corrected for spherical aberration, so the Strehl ratio is theoretically 1.0. However, if the light traverses more or less material the spot will possess spherical aberration. In the case of a conventional CD system with n=1.57 and a lens having a numerical aperture (N.A.) of 0.45, the minimum acceptable Strehl ratio is approximately 0.9. This corresponds to a deviation of the material thickness of approximately ± 0.125 mm. For a two data layer system like that shown and described in FIG. 2, this means that if the spacer layer 44 is also of material with an index of refraction near 1.57, then the spacer layer can not be any thicker than approximately 0.125 mm or the spot will have unacceptably high spherical aberration when it is focused on data layer 62. For a lens with N.A.=0.55 with the same Strehl ratio requirement of 0.9 the thickness of the spacer layer can not be larger than approximately 0.05 mm. Thus the problem of spherical aberration in a multilayer optical disk drive system is best solved by making the spacer layer as thin as possible. However, a separate problem in a multilayer optical disk drive system is interlayer crosstalk from adjacent data layers when the spot is located on the desired data layer. This problem is best solved by making the spacer layer as thick as possible.

In the present invention the multiple data layer optical disk drive system is designed so that the focused spot with minimum spherical aberration is not located on any data layer. Instead the spot is located preferably at the midpoint between the two data layers nearest and farthest from the lens. In the case of a two layer CD optical disk drive system like that shown in FIG. 2, the disk drive is designed so that the spot with minimum spherical aberration is located at the middle of spacer layer 44.

Figure 6:
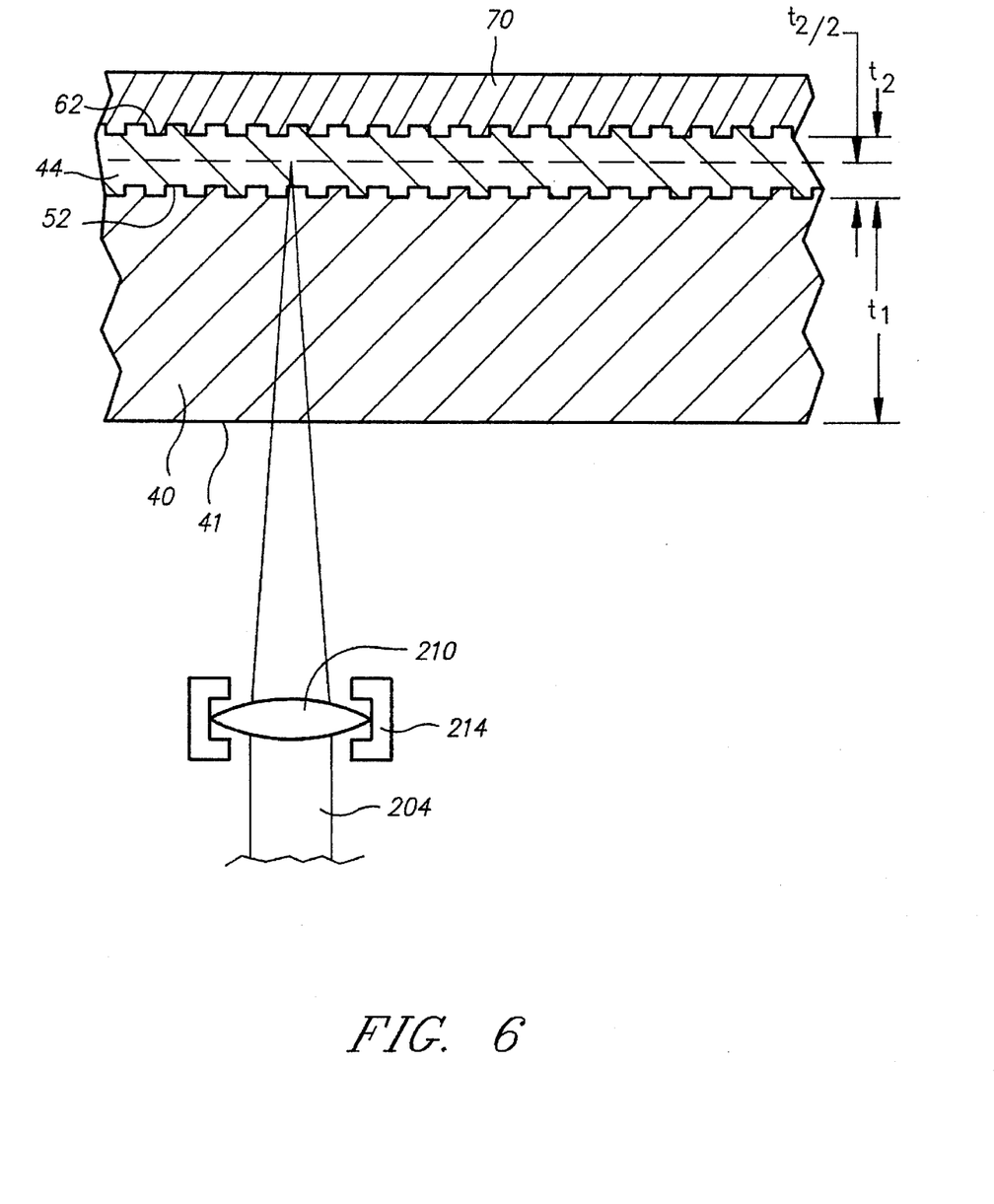
FIG. 6 is a sectional view of the two layer disk illustrating the spot with minimum spherical aberration located in the middle of the spacer layer.

Thus, as shown in FIG. 6, the focused spot with minimum spherical aberration is illustrated as being located at approximately the middle of spacer layer 44 (i.e., t2/2 distance from both data layers 52 and 62). The amount of material traversed by the light to this point is approximately the t1 thickness of substrate 40, with index of refraction of n1, and one-half the thickness of spacer layer 44 (t2/2), with index of refraction of n2. In the preferred embodiment, the lens 210 is like that used in conventional single layer disk drive systems, i.e., corrected for 1.20 mm polycarbonate (n1= 1.57) substrate thickness. However, in the preferred embodiment the substrate 40 has a thickness not equal to the conventional substrate thickness, but to the conventional thickness less t2/2 of the spacer layer 44 thickness. In the CD drive embodiment of the present invention, with a lens having N.A.=0.45, the substrate 40 thickness t1 is approximately 1.075 mm and spacer layer 44 thickness t2 is approximately 0.250 mm. For a lens with N.A.=0.55 the substrate 40 thickness t1 would be approximately 1.15 mm and spacer layer 44 thickness t2 would be approximately 0.10 mm. The spacer layer 44 material is preferably a polymer which has an index of refraction sufficiently similar to that of polycarbonate that it is only a second order effect in the spherical aberration correction and need not be factored into the selection of substrate thickness t1. However, if the index of refraction of the spacer layer is different from that of the substrate, the thickness t1 of the substrate is adjusted so that t1 of substrate material with index of refraction n1 and t2/2 of spacer layer material with index of refraction n2 together are equivalent to the thickness of material to which the lens is spherical aberration corrected.

The thickness t2 of spacer layer 44 is selected based on the minimum acceptable Strehl ratio, which in turn depends on the N.A. of the lens and the index of refraction of the substrate material. The thickness t2 is selected so that t2/2 corresponds to the maximum thickness variation where the spherical aberration is still acceptable. For a CD two data layer drive with N.A.=0.45 this is t2/2=0.125 mm (Strehl ratio=0.9) or t2=0.250 mm. The result is a doubling of the spacer layer thickness over what would be the case if the focused spot with minimum spherical aberration were located on the first data layer. The effect of interlayer crosstalk is substantially reduced while the amount of spherical aberration on both data layers is still acceptable.

An advantage of this embodiment of the present invention is that since the lens remains spherical aberration corrected for the conventional substrate thickness of a single data layer optical disk, the optical disk drive can also operate with conventional single data layer disks. Thus in the case of a CD optical disk drive system, the drive is operable with a two data layer disk (substrate thickness t1=1.075 mm and spacer layer thickness t2=0.250 mm) and is backward compatible with existing single layer CDs (substrate thickness 1.20 mm).

In an alternative embodiment of the present invention the substrate and spacer layer thicknesses are selected to optimize performance of the multiple data layer disk and the lens is spherical aberration corrected for the selected t1 of substrate with index of refraction n1 and t2 of spacer layer with index of refraction n2. In the case of CDs the conventional 1.20 mm substrates can be used for the two data layer system and the spacer layer can be made 0.250 mm thick. The lens would then be corrected for 1.325 mm [1.20+(t2/2=0.125)]of material (assuming N.A.=0.45 and the spacer layer is made of material with an index of refraction close enough to 1.57 that it has negligible effect on spherical aberration correction).

The method of correcting lenses for known spherical aberration in systems having a plano-parallel substrate is a well-known technique. The wavelength of the light and the thicknesses and indices of refraction of the material through which the light must traverse are used to generate a polynomial equation that represents the shape of the lens. This method is described, for example, by R. Kingslake, *Lens Design Fundamentals*, pp. 119–122 and 205–208, Academic Press, 1978, and is not part of the present invention.

Figure 7:
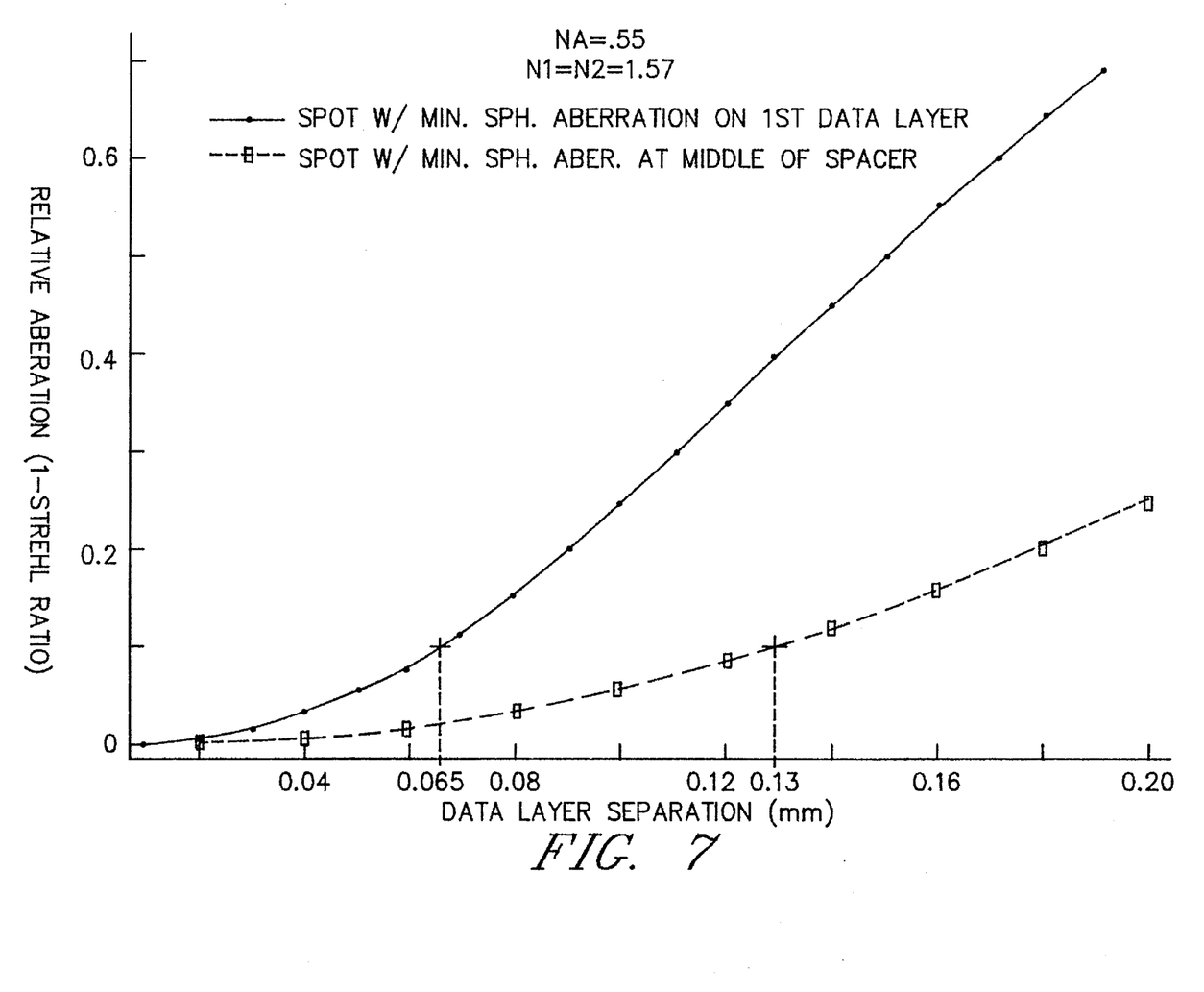
FIG. 7 is a comparison of 1-Strehl ratio as a function of achievable data layer separation (spacer layer thickness) for two optical disk drive systems with a lens with N.A.=0.55, one where the spot with minimum spherical aberration is located on the first data layer, and one where the spot with minimum spherical aberration is located in the middle of the spacer layer.

FIG. 7 illustrates the increased data layer spacing that is achievable with the present invention for a lens with N.A.= 0.55. For example, with N.A.=0.55 and an acceptable Strehl ratio of 0.9 (1-Strehl ratio of 0.1 on FIG. 7), a disk drive system with a spot with minimum spherical aberration located on the first data layer indicates that the spacer layer can be no thicker than approximately 0.065 min. However, with the present invention, where the disk drive system is designed so that spot with minimum spherical aberration is located in the middle of the spacer layer, the spacer layer thickness can be doubled to 0.13 mm. In the preferred embodiment a Strehl ratio of 0.9 has been used. However, higher or lower values of Strehl ratio may be desired, depending on the particular parameters of the disk drive system, such as the N.A. of the lens and the indices of refraction of the substrate and spacer layer.

The multiple data layer disk shown in FIG. 6 is illustrated as a solid structure where the outer layers are the substrate 40 and protective layer 70. In the case of a CD system the substrate 40 is polycarbonate with a thickness of either 1.20 mm or 1.20 mm less t2/2 , depending on the embodiment. However, the multiple data layer disk may also be fabricated by bonding two thinner single data layer disks together. In this type of structure the protective layer 70 is a second substrate identical to substrate 40. For example, in the case of a CD system, two substrates of 0.60 mm thickness and each having a data layer are bonded together with a light-transmissive material, such as a conventional photopolymer, that serves as the spacer layer. The data layer on the substrate closest to lens 210 has a partially light-transmissive covering film over its pit pattern and the data layer on the substrate farthest from lens 210 has a totally light-reflective covering film on its pit pattern.

Figure 8:
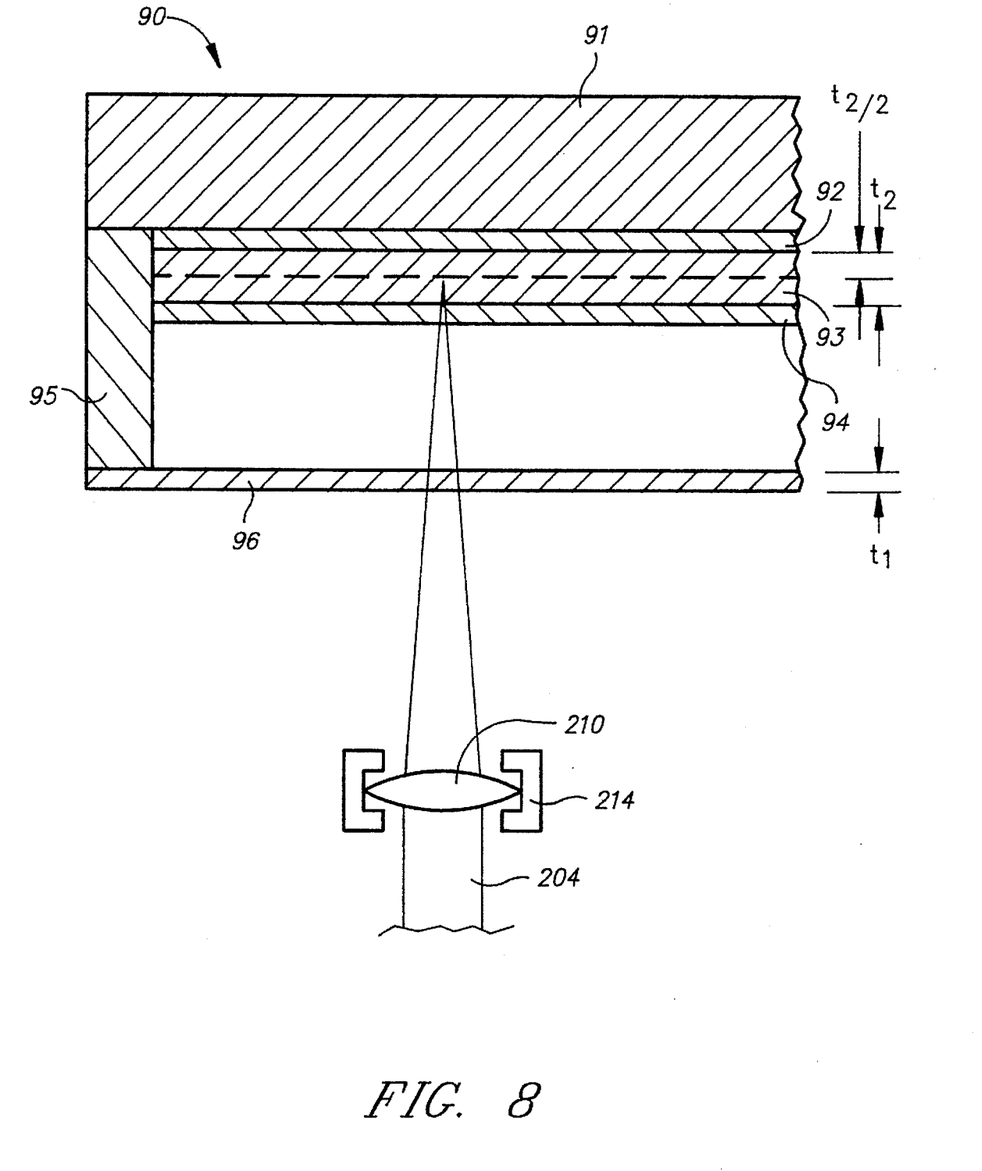
FIG. 8 is a sectional view of an air-incident two layer disk with a thin dust cover illustrating the spot with minimum spherical aberration located in the middle of the spacer layer.

FIG. 8 illustrates the invention with an alternative type of multiple data layer disk 90. The disk 90 includes an aluminum disk blank 91, a data layer 92 farthest from lens 210 formed on disk blank 91, a spacer layer 93 on data layer 92 and a data layer 94 nearest to lens 210 formed on spacer layer 93. A plastic ring 95 is bonded to aluminum disk blank 91 and extends around the outer perimeter of disk blank 91. The ring 95 supports a transparent plastic dust cover 96. The dust cover 96 is typically 100 microns thick and is stretched across and bonded to ring 95. The dust cover 96 forms an air gap of 0.2–2.0 mm between it and the data layer 94. Both data layers 92, 94 are recordable phase change WORM data layers, typically formed of In—Sb—Sn. The first data layer 94 closest to lens 210 is 60–120 Angstroms thick and is thus by its thickness partially light-transmissive. The second data layer 92 farthest from lens 210 is 400–2000 Angstroms thick and thus has an increased reflectivity over data layer 94. The spacer layer 93 is a spin-coated and cured photopolymer film with a typical thickness of 0.05–0.15 mm. As shown in FIG. 8 the focused spot with minimum spherical aberration is located at the middle of spacer layer 93. In this embodiment of the invention the "substrate" through which the light passes to the data layers 92, 94 is the dust cover 96. Thus the spherical aberration correction for the lens 210 is the correction needed due to passage of the light through the thickness of dust cover 96 (with its index of refraction n1) and through one-half the thickness of spacer layer 93 (with its index of refraction n2). Passage of light through air does not introduce any spherical aberration so the air gap between dust cover 96 and first data layer 94 does not figure into the spherical aberration correction for the lens 210.

The invention has been described with a two-layer disk. However, the invention is also applicable where there are additional data layers located between the first data layer (the one nearest the lens) and the second or last data layer (the one farthest from the lens). For example, in an eight data layer disk, where the spacer layer is defined as the thickness between the nearest and farthest data layers, the drive would be designed so that the lens is still spherical aberration corrected for t1 plus t2/2 (where t2 is the thickness of the solid light-transmissive material between the nearest and farthest data layers), and the nearly diffraction-limited spot would be located between the fourth and fifth data layers from the lens.

The invention has also been described relative to a CD system. However the invention is fully applicable with any multiple data layer optical disk, such as magneto-optic, phase change, or ablative write-once/read-many (WORM) disks.

While the preferred embodiments of the present invention have been illustrated in detail, it should be apparent that modifications and improvements may be made to the invention without departing from the spirit and scope of the invention as described in the following claims.

What is claimed is:

1. An optical data storage system comprising:
   a laser light source for generating a laser light beam;
   an optical data medium comprising a partially light-transmissive first data layer, a light-reflective second data layer, and a light-transmissive spacer layer located between and separating the first and second data layers by the thickness of said spacer layer; and
   a lens located between the laser light source and the first data layer of the medium for focusing the laser light beam to a spot, the lens having correction for spherical aberration so that the focused spot has approximately minimum spherical aberration when located between the first and second data layers.

2. An optical disk drive system of the type that includes a lens having correction for spherical aberration, the amount of correction corresponding to a fixed thickness of light-transmissive material, the system comprising:

a laser light source for generating a laser light beam;

an optical disk comprising (a) a light-transmissive substrate having a first surface that forms a disk outer face onto which the laser light is incident, (b) a partially light-transmissive first data layer on the substrate surface opposite said first surface, (c) a light-reflective second data layer, and (d) a light-transmissive spacer layer located between and separating the first and second data layers by the thickness of said spacer layer;

a motor attached to the disk for rotating the disk;

a lens located between the laser light source and said first surface of the substrate for focusing the laser light beam to a spot, the fixed thickness of light-transmissive material to which the amount of spherical aberration correction of the lens corresponds being substantially equivalent to the total substrate thickness plus approximately one-half the spacer layer thickness; and means connected to the lens for moving the lens relative to the disk so the focused spot can be moved from one data layer to another data layer; whereby when the spot is located on the first data layer it possesses spherical aberration because the total substrate and spacer layer material thickness traversed is less than the thickness of material corresponding to the amount of spherical aberration correction by approximately one-half the spacer layer thickness, and when the spot is located on the second data layer it possesses spherical aberration because the total substrate and spacer layer material thickness traversed is greater than the thickness of material corresponding to the amount of spherical aberration correction by approximately one-half the spacer layer thickness.

3. The disk drive system according to claim 2 wherein the fixed thickness of light-transmissive material corresponding to the amount of correction for spherical aberration of the lens is substantially equivalent to a substrate having a thickness t1 and an index of refraction n1, and wherein the disk substrate is formed of material having an index of refraction n1 and a thickness of approximately t1-t2/2, where t2 is the spacer layer thickness.

4. The disk drive system according to claim 2 wherein the disk substrate is formed of material having an index of refraction n1 and a thickness of approximately t1 and the spacer layer is formed of material having an index of refraction n2 and a thickness of approximately t2, and wherein the fixed thickness of light-transmissive material corresponding to the amount of correction for spherical aberration of the lens is substantially equivalent to t1 thickness of substrate material plus t2/2 thickness of spacer layer material.

5. The disk drive system according to claim 2 wherein the fixed thickness of light-transmissive material corresponding to the amount of spherical aberration correction of the lens is approximately 1.20 mm of polycarbonate, and wherein the disk substrate is formed of polycarbonate and has a thickness of approximately 1.20 mm less one-half the spacer layer thickness.

6. The disk drive system according to claim 2 wherein the fixed thickness of light-transmissive material corresponding to the amount of spherical aberration correction of the lens is approximately 0.60 mm of polycarbonate, and wherein the disk substrate is formed of polycarbonate and has a thickness of approximately 0.60 mm less one-half the spacer layer thickness.

7. The disk drive system according to claim 2 wherein the disk substrate is formed of polycarbonate and has a thickness of approximately 1.20 mm and wherein the fixed thickness of light-transmissive material corresponding to the amount of spherical aberration correction of the lens is substantially equivalent to 1.20 mm of polycarbonate plus approximately one-half the spacer layer thickness.

8. The disk drive system according to claim 2 wherein the disk substrate is formed of polycarbonate and has a thickness of approximately 0.60 mm and wherein the fixed thickness of light-transmissive material corresponding to the amount of spherical aberration correction of the lens is substantially equivalent to 0.60 mm of polycarbonate plus approximately one-half the spacer layer thickness.

9. A compact disk (CD) optical disk drive system comprising:

a laser light source for generating a laser light beam;

a CD optical disk comprising (a) a light-transmissive substrate having a thickness t1 and a first surface that forms a disk outer face onto which the laser light is incident, (b) a partially light-transmissive first data layer on the substrate surface opposite said first surface, (c) a light-transmissive spacer layer having a thickness t2 and located on the first data layer, and (d) a light-reflective second data layer on the spacer layer and separated from the first data layer by approximately t2;

a motor attached to the disk for rotating the disk;

a lens located between the laser light source and said first surface of the substrate for focusing the laser light beam to a spot, the lens having a fixed correction for spherical aberration; and means connected to the lens for moving the lens relative to the disk so the focused spot can be moved from one data layer to another data layer, the fixed spherical aberration correction of the lens having a value such that a nearly diffraction limited focused spot occurs approximately at a distance t1 plus t2/2 from said first surface of the disk substrate.

10. An optical data storage disk of the type readable by laser light transmitted through a lens having a correction for spherical aberration, the amount of correction corresponding to a fixed thickness of light-transmissive material having a known index of refraction, the disk comprising a light-transmissive substrate, a partially light-transmissive first data layer, a light-reflective second data layer, and a light-transmissive spacer layer located between and separating the first and second data layers, the thickness of the light-transmissive substrate plus one-half the thickness of the spacer layer being substantially equivalent to said fixed thickness of light-transmissive material having said known index of refraction for which the lens is spherical aberration corrected.

11. The disk according to claim 10 wherein the disk comprises a disk blank and a ring attached to and extending around the outer perimeter of the disk blank, wherein the substrate is a plastic dust cover supported by the ring and formed of material having an index of refraction n1 and a thickness of approximately t1, wherein the spacer layer is formed of material having an index of refraction n2 and a thickness of approximately t2, and wherein the disk is readable by laser light transmitted through a lens correction for spherical aberration, the amount of correction corresponding to t1 thickness of substrate material plus t2/2 thickness of spacer layer material.

12. An optical data disk of the type readable by laser light transmitted through a lens having correction for spherical aberration, the amount of correction corresponding to a thickness of light-transmissive material, the disk comprising:

- a light-transmissive substrate having a thickness t1 and a first surface that forms a disk outer face onto which the laser light is incident from the lens;
- a partially light-transmissive first data layer on the substrate surface opposite said first surface;
- a light-reflective second data layer; and
- a light-transmissive spacer layer having a thickness t2 and located between and separating the first and second data layers, the thickness t1 of substrate material plus one-half the thickness t2 of spacer layer material being substantially equivalent to the thickness of light-transmissive material corresponding to said amount of correction for spherical aberration of the lens.

13. The disk according to claim 12 wherein the disk is a compact disk (CD), wherein the substrate is formed of polycarbonate, and wherein the amount of spherical aberration correction required for the thickness t1 of substrate material plus one-half the thickness t2 of spacer layer material is substantially equivalent to the amount of spherical aberration correction required for approximately 1.20 millimeters of polycarbonate.

14. The disk according to claim 12 wherein the disk is a compact disk (CD), wherein the substrate is formed of polycarbonate, and wherein the amount of spherical aberration correction required for the thickness t1 of substrate material plus one-half the thickness t2 spacer layer material is substantially equivalent to the amount of spherical aberration correction required for approximately 0.60 millimeters of polycarbonate.

* * * * *